United States Patent
Gao et al.

(10) Patent No.: US 10,139,557 B2
(45) Date of Patent: Nov. 27, 2018

(54) DISPLAY DEVICE WITH BACKLIGHT MODULE USING ELECTRICALLY CONDUCTIVE ADHESIVE AND GROUNDING WIRE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Liang Gao, Beijing (CN); Gongtao Zhang, Beijing (CN); Haiwei Sun, Beijing (CN); Jian Sang, Beijing (CN); Xiujun Cai, Beijing (CN); Shuanhu Di, Beijing (CN); Junjie Ma, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 151 days.

(21) Appl. No.: 15/325,379

(22) PCT Filed: Mar. 8, 2016

(86) PCT No.: PCT/CN2016/075829
§ 371 (c)(1),
(2) Date: Jan. 10, 2017

(87) PCT Pub. No.: WO2017/049882
PCT Pub. Date: Mar. 30, 2017

(65) Prior Publication Data
US 2017/0307809 A1    Oct. 26, 2017

(30) Foreign Application Priority Data

Sep. 21, 2015  (CN) .......................... 2015 1 0605299

(51) Int. Cl.
*F21V 8/00* (2006.01)
*H05F 3/02* (2006.01)

(52) U.S. Cl.
CPC ......... *G02B 6/0093* (2013.01); *G02B 6/0083* (2013.01); *H05F 3/02* (2013.01)

(58) Field of Classification Search
CPC ............... G02B 6/0093; G02B 6/0083; G02F 1/136204; G02F 2001/133612; G02F 1/133615
See application file for complete search history.

(56) References Cited

U.S. PATENT DOCUMENTS

| | | | | |
|---|---|---|---|---|
| 8,434,884 B2 * | 5/2013 | Chiu | ................. | G02F 1/133615 362/249.02 |
| 2006/0065426 A1 * | 3/2006 | Anderson | ................ | H01R 4/04 174/71 R |

(Continued)

FOREIGN PATENT DOCUMENTS

| CN | 202813002 U | 3/2013 |
|---|---|---|
| CN | 203615191 U | 5/2014 |

(Continued)

OTHER PUBLICATIONS

First Chinese Office Action dated Feb. 17, 2017, for corresponding Chinese Application No. 201510605299.8.

(Continued)

*Primary Examiner* — Alexander Garlen
*Assistant Examiner* — Christopher E Dunay
(74) *Attorney, Agent, or Firm* — Kinney & Lange, P.A.

(57) ABSTRACT

The disclosure relates to a backlight module and a display device. The backlight module includes: a conductive adhesive tape configured for adhering the backlight module to a display panel to transfer electrostatic charges in the display panel to the backlight module; and a first wire configured to lead the electrostatic charges out from the backlight module, the electrostatic charges led out from the backlight module at least including the electrostatic charges transferred from the display panel to the backlight module, electrostatic (Continued)

charges generated in the backlight module, or a combination thereof. Electrostatic charges in the display panel are led into the backlight module through the conductive adhesive tape, and are led out via the first wire of the backlight module, so that no wire needs to be provided in the display panel for leading out the electrostatic charges, that is, it is not necessary to adjust wirings in the display panel.

17 Claims, 3 Drawing Sheets

(56) References Cited

U.S. PATENT DOCUMENTS

| | | | |
|---|---|---|---|
| 2007/0171215 A1* | 7/2007 | Song | G02B 6/0083 345/204 |
| 2011/0216270 A1* | 9/2011 | Koyama | G02F 1/133308 349/65 |
| 2014/0022744 A1* | 1/2014 | Joo | H05K 5/0017 361/749 |
| 2016/0147105 A1* | 5/2016 | Ha | G02F 1/13452 349/33 |
| 2016/0306218 A1* | 10/2016 | Onishi | G02F 1/134336 |
| 2017/0227809 A1* | 8/2017 | Sato | G02F 1/133308 |

FOREIGN PATENT DOCUMENTS

| | | |
|---|---|---|
| CN | 104730746 A | 6/2015 |
| CN | 105114876 A | 12/2015 |
| CN | 205048263 U | 2/2016 |
| JP | 200820348 A | 9/2008 |
| JP | 2008203448 A | 9/2008 |

OTHER PUBLICATIONS

International Search Report and Written Opinion from PCT Application Serial No. PCT/CN2016/075829, dated Jun. 22, 2016, 12 pages.

* cited by examiner

DISPLAY DEVICE WITH BACKLIGHT MODULE USING ELECTRICALLY CONDUCTIVE ADHESIVE AND GROUNDING WIRE

CROSS-REFERENCE TO RELATED APPLICATION

This application is a Section 371 National Stage Application of International Application No. PCT/CN2016/075829, filed on 8 Mar. 2016, entitled "BACKLIGHT MODULE AND DISPLAY DEVICE", which has not yet published, and which claims priority to Chinese Application No. 201510605299.8, filed on 21 Sep. 2015, incorporated herein by reference in their entirety.

BACKGROUND

Technical Field

Embodiments of the present disclosure generally relate to the field of display technologies, and particularly, to a backlight module and a display device.

Description of the Related Art

ESD (electrostatic discharge) will occur in interior of an existing display device including a display panel and a backlight module due to factors such as manufacturing processes or environment, and if electrostatic charges could not be quickly and efficiently led out, accumulation of more electrostatic charges may result in a higher electrostatic voltage in a local portion of the display device, for example in a local portion of the display panel or the backlight module and thus in a larger discharging current, which will cause damage to circuits or configurations of the display panel or backlight module.

SUMMARY

One problem aimed to be solved in the present disclosure is how to quickly and efficiently lead electrostatic charges out from a display device.

According to an aspect of the present disclosure, there is provided a backlight module, comprising:

a conductive adhesive tape configured for adhering the backlight module to a display panel so as to transfer electrostatic charges in the display panel to the backlight module; and a first wire configured to lead electrostatic charges out from the backlight module, the electrostatic charges led out from the backlight module at least including the electrostatic charges transferred from the display panel to the backlight module, electrostatic charges generated in the backlight module, or a combination thereof.

Preferably, the backlight module further comprises a light bar, the first wire is disposed in the light bar, and the conductive adhesive tape is adhered to the light bar and electrically contacts the first wire.

Preferably, the backlight module further comprises a light guide plate, and the light bar is arranged at a side face of the light guide plate.

Preferably, the conductive adhesive tape is arranged at an edge of the light guide plate and at a side of the light bar adjacent to the display panel and is configured for shielding light emitted from the edge of the light guide plate.

Preferably, a conductive structure is provided on a side of the light bar adjacent to the display panel and is connected to the first wire, and the conductive adhesive tape electrically contacts the conductive structure.

Preferably, the conductive adhesive tape is in surface contact with the conductive structure.

Preferably, the light bar is provided therein with a receiving space in which the conductive structure is arranged.

Preferably, the conductive adhesive tape comprises:

a first conductive adhesive layer adhered to a surface of the backlight module facing the display panel;

a conductive base layer provided on the first conductive adhesive layer; and a second conductive adhesive layer provided on the conductive base layer and configured for adhering the display panel.

Preferably, at least one of a base material of the first conductive adhesive layer, a base material of the second conductive adhesive layer, and a base material of the conductive base layer comprises a non-transparent material.

Preferably, conductive particles are provided in the base material of the first conductive adhesive layer and in the base material of the second conductive adhesive layer and include at least one of nickel, silver, aluminum and copper.

Preferably, the backlight module further comprises:

a first flexible circuit board, on which a drive circuit for the backlight module is arranged, and which is configured to be connected with an external second flexible circuit board provided with a ground wire through a pad region where a terminal is provided for the ground wire.

According to another aspect of the present disclosure, there is further provided a display device, comprising the backlight module as described above.

Preferably, the display device further comprises:

a second flexible circuit board configured for connecting to an external power supply and provided with a ground wire, the second flexible circuit board being further configured to be connected with a first flexible circuit board in the backlight module through a pad region where a terminal is provided for the ground wire, and the first wire is connected with the terminal.

With abovementioned technique solutions provided according to embodiments of the present disclosure, the electrostatic charges in the display panel are led into the backlight module through the conductive adhesive tape, and are led out or discharged via the first wire of the backlight module, so that on one hand, no wire needs to be provided in the display panel for leading out the electrostatic charges, that is, it is not necessary to adjust wirings in the display panel, thereby facilitating arrangement of an electrostatic charge leading-out structure; on the other hand, electrostatic charges needs to be led in from a side face of the display panel when an electrostatic charge discharge test is made for the display panel, and the light bar is arranged at the side face of the light guide plate and thus at a side face of the display panel, thus the conductive adhesive tape contacting the light bar is also located at the side face of the display panel, so that the electrostatic charges led in from the side face of the display panel can be quickly transferred to the light bar and led out, thereby improving a throughput rate of the electrostatic charge discharge test.

BRIEF DESCRIPTION OF THE DRAWINGS

Features and advantages of the present disclosure will be understood more clearly with reference to accompanying drawings, which are illustrative and should not be interpreted as being limitative to the present disclosure and in which.

LISTS OF REFERENCE NUMERALS

1—conductive adhesive tape; 11—first conductive adhesive layer; 12—conductive base layer; 13—second conductive adhesive layer; 2—first wire; 3—light bar; 4—light guide plate; 5—pad region; 6—terminal; 10—backlight module; 20—display panel.

DETAILED DESCRIPTION OF PREFERRED EMBODIMENTS

In order to provide a more clear understanding of above objects, features and advantages of the present disclosure, the present disclosure will be further described hereinafter in detail in conjunction with preferred embodiments and with reference to the attached drawings. It is noted that embodiments and features thereof of the present disclosure may be randomly combined without conflicting.

Further, in the following detailed description, for purposes of explanation, numerous specific details are set forth in order to provide a thorough understanding of the present disclosure. It will be apparent, however, that the present disclosure may also be implemented in other ways different from those described herein. Thus, scopes of the present invention will not be limited to the following disclosed exemplary embodiments.

Figure 6:
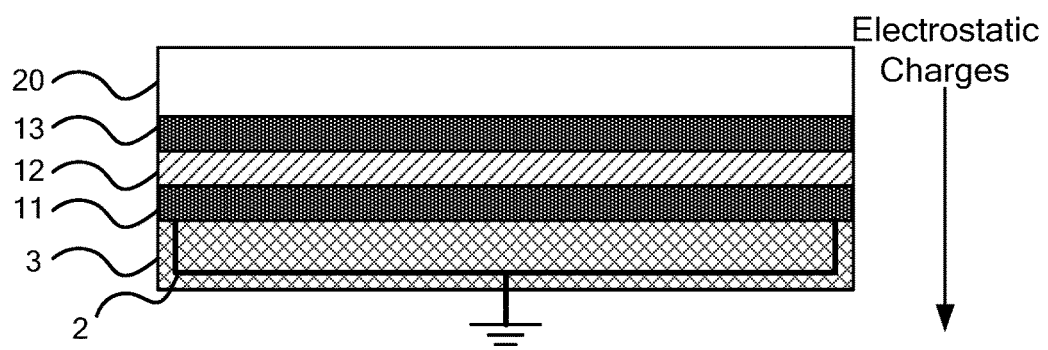
FIG. 6 is a schematic diagram showing flow direction of electrostatic charges according to an embodiment of the present disclosure.

As shown in FIG. 1 to FIG. 7, a backlight module 10 according to an exemplary embodiment of the present disclosure comprises:

a conductive adhesive tape 1 configured for adhering the backlight module 10 to a display panel 20 so as to transfer electrostatic charges in the display panel 20 to the backlight module; and a first wire 2 configured to lead or discharge the electrostatic charges out from the backlight module; the electrostatic charges led out from the backlight module may at least include the electrostatic charges transferred from the display panel to the backlight module, electrostatic charges generated in the backlight module, or a combination thereof; for example, as shown in FIG. 6, the first wire 2 may be grounded.

Since the display panel 20 is provided with many circuits and wirings such as a thin film transistor, a data line, a gate line and the like, it will be very difficult to additionally provide an electrostatic charge discharge circuit in the display panel 20. In embodiments of the present disclosure, the electrostatic charges in the display panel 20 are led into the backlight module 10 through the conductive adhesive tape 1, and are led out or discharged via the first wire 2 of the backlight module 10, so that no electrostatic charge discharge circuit needs to be provided in the display panel 20, that is, it is not necessary to adjust wirings in the display panel 20, thereby facilitating arrangement of an electrostatic charge leading-out structure.

Further, electrostatic charges needs to be led-in from a side face of the display panel when an electrostatic charge discharge test is made for the display panel, and the light bar is arranged at the side face of the light guide plate and thus at a side face of the display panel, thus the conductive adhesive tape contacting the light bar is also located at the side face of the display panel, so that the electrostatic charges led in from the side face of the display panel can be quickly transferred to the light bar and led out.

Preferably, the backlight module 10 further comprises a light bar 3. In an example, the first wire 2 is disposed in the light bar 3, and the conductive adhesive tape 1 is adhered to the light bar 3 and electrically contacts the first wire 2.

In the backlight module 10, a conductive structure, for example, a drive circuit for the light bar 3 and a first flexible circuit board provided with corresponding wirings, is generally provided at the light bar 3. In embodiments of the present disclosure, the first wire 2 is disposed in the light bar 3, so that the first wire 2 may lead out the electrostatic charges through a shorter circuit structure or a conduction path.

Preferably, the backlight module 10 further comprises a light guide plate 4. In an example, the light bar 3 is arranged at a side face of the light guide plate 4.

Figure 1:
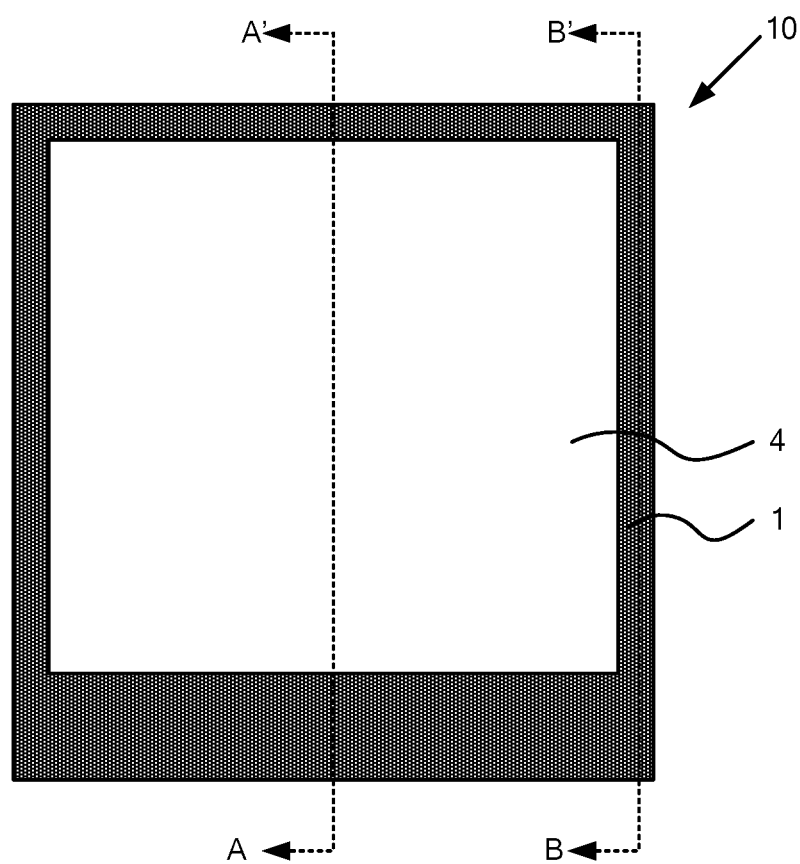
FIG. 1 is a schematic diagram showing a structure of a backlight module according to an embodiment of the present disclosure.
Figure 2:
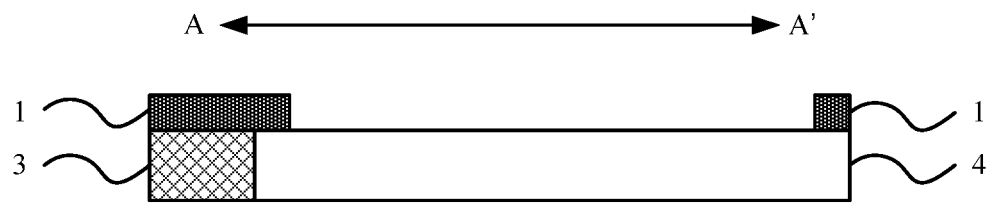
FIG. 2 is a schematic cross sectional view taken along line AA' shown in FIG. 1.
Figure 3:
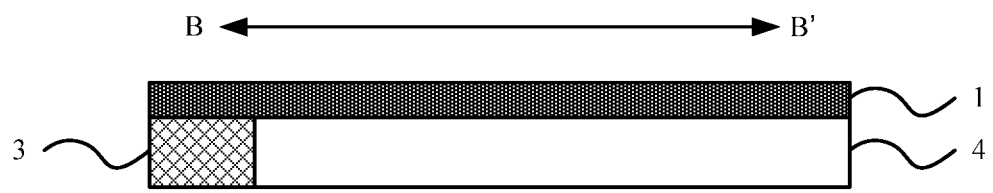
FIG. 3 is a schematic cross sectional view taken along line BB' shown in FIG. 1.

Preferably, the conductive adhesive tape 1 is arranged at or covers an edge or peripheral region of the light guide plate 4 (as shown in FIGS. 1 and 2) and at a side of the light bar adjacent to the display panel 20, and is configured for shielding light emitted from the edge or peripheral region of the light guide plate 4.

Figure 4:
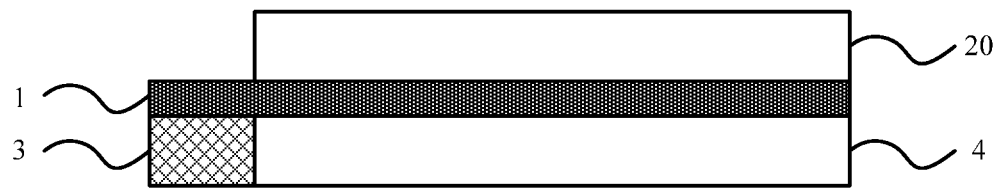
FIG. 4 is a schematic diagram showing a backlight module, adhered to a display panel, according to an embodiment of the present disclosure.

As shown in FIG. 4, the display panel 20 may be disposed at a position corresponding to the light guide plate 4, or orthogonal projections of the display panel 20 and the light guide plate 4 within a plane parallel to the light guide plate may be substantially overlapped with each other, such that light emitted from the light bar 3 enters the light guide plate 4 and then is transmitted through the light guide plate 4 to the whole upper surface of the light guide plate 4 and uniformly outputted to the display panel 20.

Preferably, a conductive structure (not shown) is provided on a side of the light bar 3 adjacent to the display panel 20, and the conductive structure is connected to the first wire 2, and the conductive adhesive tape 1 electrically contacts the conductive structure.

Preferably, the conductive adhesive tape 1 is in surface contact with the conductive structure provided on the light bar.

In an example, the conductive structure provided on the light bar may be a metal layer provided on a side of the light bar 3 adjacent to the display panel 20, and, the metal layer may be made of the same material as the first wire 2. In an example, the metal layer may be only provided at two ends of the light bar 3. The conductive adhesive tape 1 is arranged to be in surface contact with the conductive structure, so that it enables a smaller resistance and a good electrical connection between the conductive adhesive tape 1 and the first wire 2, thereby charges in the conductive adhesive tape 1 could be well transferred to the first wire 2 and led out by the first wire 2.

Preferably, a receiving space, such as a through hole, an opening or a recess, may be provided in the light bar 3, for example, on a side of the light bar adjacent to the display panel 20, and the conductive structure is received in the receiving hole.

Since the conductive structure is received in the receiving space formed in the light bar, the thickness of the backlight module 10 will not be increased, thereby facilitating thinning and light weight. Further, the conductive structure in the receiving space contacts the conductive adhesive tape 1, so a probability of open circuit connection between the conductive adhesive tape and the first wire 2 may be reduced, thereby it can ensure charges in the conductive adhesive tape 1 could be well transferred to the first wire 2 and led out by the first wire 2.

Figure 5:
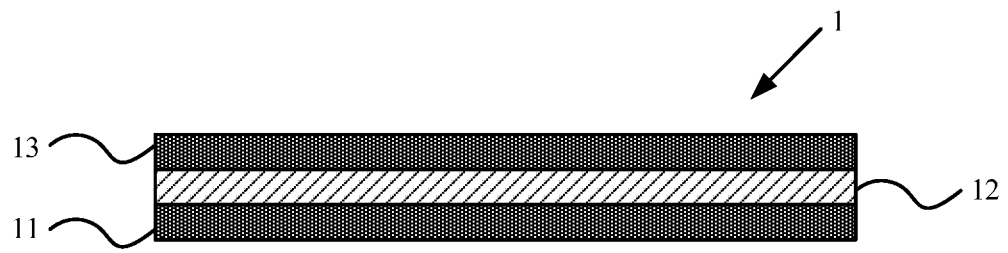
FIG. 5 is a schematic diagram showing a structure of a conductive adhesive tape according to an embodiment of the present disclosure.

As shown in FIG. 5, preferably, the conductive adhesive tape 1 comprises:

a first conductive adhesive layer 11 adhered to a surface of the backlight module facing the display panel 20, for example, adhered to or provided on a surface of the light bar and/or the light guide plate facing the display panel 20;

a conductive base layer 12 provided on the first conductive adhesive layer 11; and a second conductive adhesive layer 13 provided on the conductive base layer 12 and configured for adhering the display panel 20.

Preferably, at least one of a base material of the first conductive adhesive layer 11, a base material of the second conductive adhesive layer 13, and a base material of the conductive base layer 12 comprises a non-transparent material.

The non-transparent conductive adhesive tape 1 is arranged at or covers the edge or peripheral region of the light guide plate 4 and may shield light emitted from a region of the light guide plate 4 located outside of the display panel 20 or in a region of the light guide plate 4 being not overlapped with the display panel (for example a gap between the display panel 20 and an edge frame), thereby leakage of light can be avoided in order to ensure a good display effect.

Preferably, conductive particles are provided or distributed in the base material of the first conductive adhesive layer 1 and in the base material of the second conductive adhesive layer 13. The conductive particles may include at least one of nickel, silver, aluminum and copper.

The base materials of the first conductive adhesive layer 11 and the second conductive adhesive layer 1 may be polyethylene glycol terephthalate (PET), and the conductive base layer 12 may be made of a material having a good conductivity, for example, aluminum, copper, graphite or the like, such that, after electrostatic charges are transferred from the display panel to the first conductive adhesive layer 11, the electrostatic charges can be transferred quickly from the first conductive adhesive layer 11 to the second conductive adhesive layer 13 through the conductive base layer 12, and then are transferred from the second conductive adhesive layer 13 to the first wire 2 in the light bar 3 and led out, as shown in FIG. 6.

It is noted that, although FIG. 6 shows that there are only two contact points between the first wire 2 and the second conductive adhesive layer 13, the contact structure between the first wire 2 and the second conductive adhesive layer 13 may be designed as required in practice, for example, the surface contact in the above embodiments or a contact via a through hole may be used.

Figure 7:
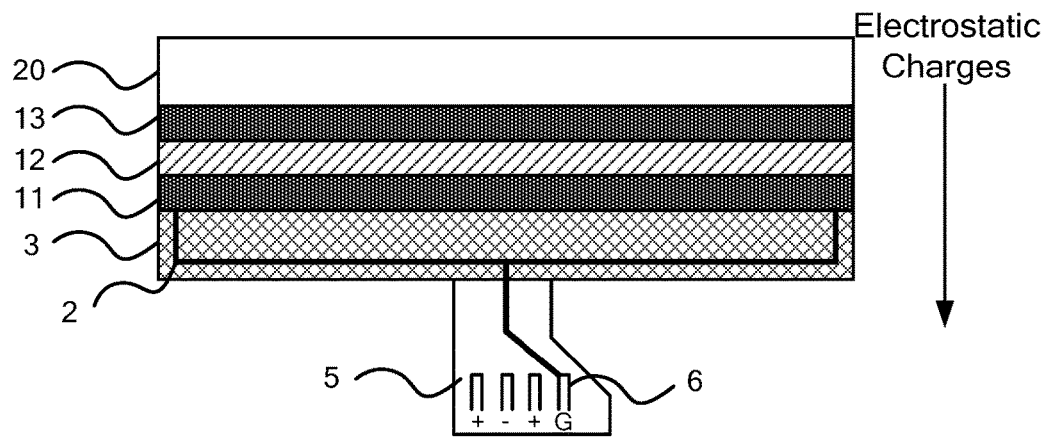
FIG. 7 is a schematic diagram showing flow direction of electrostatic charges according to another embodiment of the present disclosure.

Preferably, the backlight module 10 further comprises:

a first flexible circuit board (not shown), on which a drive circuit for the backlight module is arranged, and which is configured to be connected with an external second flexible circuit board, which is provided with a ground wire, through a pad region 5 where a terminal 6 is provided for the ground wire; in an example, the first wire 2 is connected with the terminal 6, as shown in FIG. 7.

In an example, an extension line for the first wire 2 may be provided on the first flexible circuit board so as to be connected with the terminal 6 of the ground wire in the pad region. The ground wire may be provided on the second flexible circuit board and configured for connecting to an external power supply. The ground wire is connected with the terminal 6, through which electrostatic charges are led into the ground wire from the first wire 2 and are finally led out from a display device where the backlight module is provided.

An embodiment of the present disclosure further provides a display device, comprising the backlight module as described in any of the above embodiments.

It is noted that the display device according to the embodiments of the present disclosure may include an electronic paper, a mobile phone, a tablet computer, a television, a notebook computer, a digital photo frame, a navigator or other product or component that has a display function.

Preferably, display device further comprises:

a second flexible circuit board configured for connecting to an external power supply and provided with a ground wire, the second flexible circuit board being further configured to be connected with a first flexible circuit board in the backlight module through a pad region where a terminal is provided for the ground wire, and the first wire is connected with the terminal.

Technique solutions according to embodiments of the present disclosure have been described above in detail. In prior arts, it is difficult to quickly and efficiently lead electrostatic charges out from a display panel, and a throughout rate for an electrostatic charge test of the display panel is lower. With technique solutions according to embodiments of the present disclosure, the electrostatic charges in the display panel are led into the backlight module through the conductive adhesive tape, and are led out or discharged via the first wire of the backlight module, so that on one hand, no wire needs to be provided in the display panel for leading out the electrostatic charges, that is, it is not necessary to adjust wirings in the display panel, thereby facilitating arrangement of an electrostatic charge leading-out structure; on the other hand, electrostatic charges needs to be led-in from a side face of the display panel when an electrostatic charge discharge test is made for the display panel, and the light bar is arranged at the side face of the light guide plate and thus at a side face of the display panel, thus the conductive adhesive tape contacting the light bar is also located at the side face of the display panel, so that the electrostatic charges led-in from the side face of the display panel can be quickly transferred to the light bar and led out, thereby improving a throughput rate of the electrostatic charge discharge test. Exemplarily, in the embodiments of the present disclosure, the electrostatic charges led out by the first wire from the backlight module may at least include the electrostatic charges transferred from the display panel to the backlight module, electrostatic charges transferred from other structure(s) (e.g., a power supply, a peripheral circuit or the like) of the display device to the backlight module, electrostatic charges generated in the backlight module (e.g., electrostatic charges generated or accumulated in the light bar, the light guide plate, the circuit board or the like of the backlight module), or a random combination thereof, which will not be limited herein.

It is noted that in the drawings, sizes of layers and regions may be exaggerated for purpose of clear illustration. Further, it will be appreciated that when an element or layer is described as being "on" another element or layer, it may be directly located on the another element or layer, or there may be an intermediate layer therebetween. In addition, it will be understood that when an element or layer is described as being "under" another element or layer, it may be directly located under the another element or layer, or there may be at least one intermediate layer or element therebetween. Furthermore, it will be also understood that when an element or layer is described as being "between" two layers or elements, it may be the sole layer between the two layers or elements, or there may be also at least one intermediate layer or element therebetween. Similar reference numerals indicate similar elements throughout the document.

In the present disclosure, terms such as "first", "second" are only used for purpose of description, and should be understood as indicating or implying relative importance. Term "a plurality of" means two or more than two, unless explicitly stated otherwise.

It should be understood that the above embodiments are merely exemplary embodiments of the present disclosure and are not intended to limit the present disclosure. For those skilled in the art, various modifications and changes may be made to the embodiments of the present disclosure without deviating from the spirit and scope of the present invention, and all the modifications, alternatives and equivalents fall within the scopes of the present invention.

What is claimed is:

1. A display device, comprising:
    a display panel;
    a backlight module comprising:
        a light guide plate;
        a light bar; and
        wherein the light bar is arranged at a side face of the light guide plate;
    an electrically conductive adhesive tape adhering the display panel to the backlight module so as to transfer electrostatic charges in the display panel to the backlight module; and
    a first wire disposed in the light bar leading electrostatic charges generated in at least one of the backlight module and the display panel away therefrom; and
    wherein the electrically conductive adhesive tape is adhered to the light bar and electrically contacts the first wire.

2. The display device according to claim 1, wherein the conductive adhesive tape is arranged at an edge of the light guide plate and at a side of the light bar adjacent to the display panel and is configured for shielding light emitted from the edge of the light guide plate.

3. The display device according to claim 2, wherein a conductive structure is provided on a side of the light bar adjacent to the display panel and is connected to the first wire, and the conductive adhesive tape electrically contacts the conductive structure.

4. The display device according to claim 3, wherein the conductive adhesive tape is in surface contact with the conductive structure.

5. The display device according to claim 4, wherein the conductive adhesive tape comprises: a first conductive adhesive layer adhered to a surface of the backlight module facing the display panel; a conductive base layer provided on the first conductive adhesive layer; and a second conductive adhesive layer provided on the conductive base layer and configured for adhering the display panel.

6. The display device according to claim 3, wherein the conductive adhesive tape comprises: a first conductive adhesive layer adhered to a surface of the backlight module facing the display panel; a conductive base layer provided on the first conductive adhesive layer; and a second conductive adhesive layer provided on the conductive base layer and configured for adhering the display panel.

7. The display device according to claim 2, wherein the light bar is provided therein with a receiving space in which the conductive structure is arranged.

8. The display device according to claim 7, wherein the conductive adhesive tape comprises: a first conductive adhesive layer adhered to a surface of the backlight module facing the display panel; a conductive base layer provided on the first conductive adhesive layer; and a second conductive adhesive layer provided on the conductive base layer and configured for adhering the display panel.

9. The display device according to claim 2, wherein the conductive adhesive tape comprises: a first conductive adhesive layer adhered to a surface of the backlight module facing the display panel; a conductive base layer provided on the first conductive adhesive layer; and a second conductive adhesive layer provided on the conductive base layer and configured for adhering the display panel.

10. The display device according to claim 1, wherein the conductive adhesive tape comprises: a first conductive adhesive layer adhered to a surface of the backlight module facing the display panel; a conductive base layer provided on the first conductive adhesive layer; and a second conductive adhesive layer provided on the conductive base layer and configured for adhering the display panel.

11. The display device according to claim 10, wherein at least one of a base material of the first conductive adhesive layer, a base material of the second conductive adhesive layer, and a base material of the conductive base layer comprises a non-transparent material.

12. The display device according to claim 11, wherein conductive particles are provided in the base material of the first conductive adhesive layer and in the base material of the second conductive adhesive layer and include at least one of nickel, silver, aluminum and copper.

13. The display device according to claim 1, further comprising: a first flexible circuit board, on which a drive circuit for the backlight module is arranged, and which is configured to be connected with an external second flexible circuit board provided with a ground wire through a pad region where a terminal is provided for the ground wire, wherein the first wire is connected with the terminal.

14. The display device according to claim 1, further comprising: a second flexible circuit board configured for connecting to an external power supply and provided with a ground wire, the second flexible circuit board being further configured to be connected with a first flexible circuit board in the backlight module through a pad region where a terminal is provided for the ground wire, wherein the first wire is connected with the terminal.

15. The display device according to claim 1, wherein the conductive adhesive tape comprises: a first conductive adhesive layer adhered to a surface of the backlight module facing the display panel; a conductive base layer provided on the first conductive adhesive layer; and a second conductive adhesive layer provided on the conductive base layer and configured for adhering the display panel.

16. The display device according to claim 1, wherein the conductive adhesive tape comprises: a first conductive adhesive layer adhered to a surface of the backlight module facing the display panel; a conductive base layer provided on the first conductive adhesive layer; and a second conductive adhesive layer provided on the conductive base layer and configured for adhering the display panel.

17. The display device according to claim 1, further comprising: a first flexible circuit board, on which a drive circuit for the backlight module is arranged, and which is configured to be connected with an external second flexible circuit board provided with a ground wire through a pad region where a terminal is provided for the ground wire, wherein the first wire is connected with the terminal.

* * * * *